Feb. 7, 1961 L. H. NIEMS 2,970,828
APPARATUS FOR COOLING REFRACTORY PARTICLES
Filed Feb. 10, 1955 3 Sheets-Sheet 2

Inventor
LEE H. NIEMS

Feb. 7, 1961   L. H. NIEMS   2,970,828
APPARATUS FOR COOLING REFRACTORY PARTICLES
Filed Feb. 10, 1955   3 Sheets-Sheet 3

Inventor
LEE H. NIEMS
by Hill, Sherman, Meroni, Gross & Simpson
Attys.

United States Patent Office 2,970,828
Patented Feb. 7, 1961

2,970,828

APPARATUS FOR COOLING REFRACTORY PARTICLES

Lee H. Niems, Homewood, Ill., assignor to Marblehead Lime Company, Chicago, Ill., a corporation of Delaware Filed Feb. 10, 1955, Ser. No. 487,336

4 Claims. (Cl. 263—32)

The present invention is directed to a method of and apparatus for cooling refractory particles in a continuous manner. The invention has particular applicability to the cooling of "dead burned" dolomite pellets, cement clinker, taconite, and the like.

In various heat treatment processes involving the above mentioned refractory pellets or particles, it is customary to subject the material being processed to elevated temperatures up to 3000° F., in a rotary kiln for the purpose of modifying the physical or chemical characteristics of the particles. Following this high temperature treatment, it is essential to cool the particles rapidly and thoroughly from a temperature in excess of 2000° F. to obtain certain characteristics in the product, and to make them suitable for subsequent handling. For reasons of thermal efficiency, it is desirable to abstract the heat from these particles so that it can be reused for combustion and for drying the fuel. For this reason, it is customary to pass currents of air through the particles after they leave the rotary kiln and to collect a part of the air thus heated for combustion and drying. In presently used coolers, it is not possible to collect all the air used for cooling since cross flow and low cooling efficiencies require that more air be used for cooling than can be used for combustion, so that these coolers must be provided with large stacks to vent the excess air.

Dead-burned dolomite particles are particularly troublesome to cool because a bed of such particles has a substantial resistance to the passage of air. If the particles are allowed to settle by gravity as they fall from the discharge end of the rotary kiln, they will tend to agglomerate into hard, substantially impervious masses which cannot be effectively discharged from the cooling space in a continuous manner, nor effectively cooled.

When particles of this type settle by gravity, there is a pronounced tendency in the resulting bed toward classification of the particles according to their size. The finer particles or pebbles normally accumulate at the center of the mass and the coarser material gravitates toward the edges of the mass. Ultimately, free settling of such particles results in a conically shaped bed having the apex at the center where the finely divided particles are congregated. This natural settling tendency further complicates the cooling problem. Since a large proportion of the fine particles are at the center, and the center is of greater depth than the remainder of the bed, air flow through the mass meets substantially more resistance at the center than it does at the edges. Consequently, the air being introduced into the base of the mass will tend to follow the path of least resistance, and most of the air will be channelled out toward the edges rather than going through the center of the mass. As the amount of air passing through the center decreases, the material contained therein becomes hotter and the air flowing in the center also becomes hotter. This higher temperature further increases the mass flow resistance, since this resistance varies as the absolute temperature of the air. Consequently, in a short time the cumulative effect of these factors provides an uncooled mass at the center of the particle bed and a highly inefficient condition of heat transfer.

Another factor which contributes to this undesirable distribution pattern of air through the mass is what is known as the "wall effect." The coarser particles which tend to settle along the walls of the cooling chamber are not as closely interpacked as the rest of the bed, so that the resistance to air flow along the walls is considerably decreased. Consequently, channelling effects are produced immediately at the wall surface where the resistance to air flow is less than at other points in the mass, and extend in toward the center of the mass to a distance several times that of the individual particle dimensions due to off-shoots of air from the air stream along the wall.

While it is important to obtain a uniform flow of air through the mass to secure adequate cooling, it is also necessary to obtain a uniform downdraw of material through the cooling zone. If a discharge outlet of simple hopper form is provided centrally of the cooler, there will be a tendency for the finely divided material at the center of the discharge point to discharge more rapidly than the material along the sides of the cooler, thereby aggravating the problem even further.

With the foregoing in mind, an object of the present invention is to provide an improved method for securing adequate cooling of refractory particles.

A further object of the invention is to provide a method for agitating heated refractory particles in a dense fluid suspension to cool the same while preventing agglomeration and fusion of the particles so that they can be discharged effectively.

Another object of the invention is to provide a method for agitating particles being cooled to provide a substantially level bed surface important in obtaining uniform air flow across the bed.

Another object of the invention is to provide an improved method for introducing air into a cooling zone associated with a rotary kiln.

A still further object of the invention is to provide an improved apparatus for cooling refractory particles.

A further object of the invention is to provide an apparatus for controlling the distribution of air through a mass of refractory particles being cooled.

In the process of the present invention, the refractory particles are cooled, preferably immediately after their discharge from the rotary kiln, by introducing air into a mass of the particles beneath the surface thereof at a mass velocity sufficient to suspend the particles near the surface of the mass into a dense suspension. With the proper adjustment of air velocity and volume, the surface of the mass will assume a substantially level configuration, and the particles will be thoroughly agitated. The problems of channelling the air to the sides due to a coned up bed surface with a segregation of fines in the center are thereby minimized. Subsequently, the particles are discharged as a continuous stream and subjected to the cooling effects of additional quantities of air passing in countercurrent contact therewith before they leave the cooling zone. In a preferred form of the invention, at least a portion of the air after passing through the bed of particles is withdrawn from the cooler and recirculated together with added amounts of fresh air back into the cooling zone.

Other and further objects and features of the present invention will become apparent to those skilled in the art from the following description of the attached sheets of drawings which illustrate several preferred embodiments of the invention.

Figure 1:
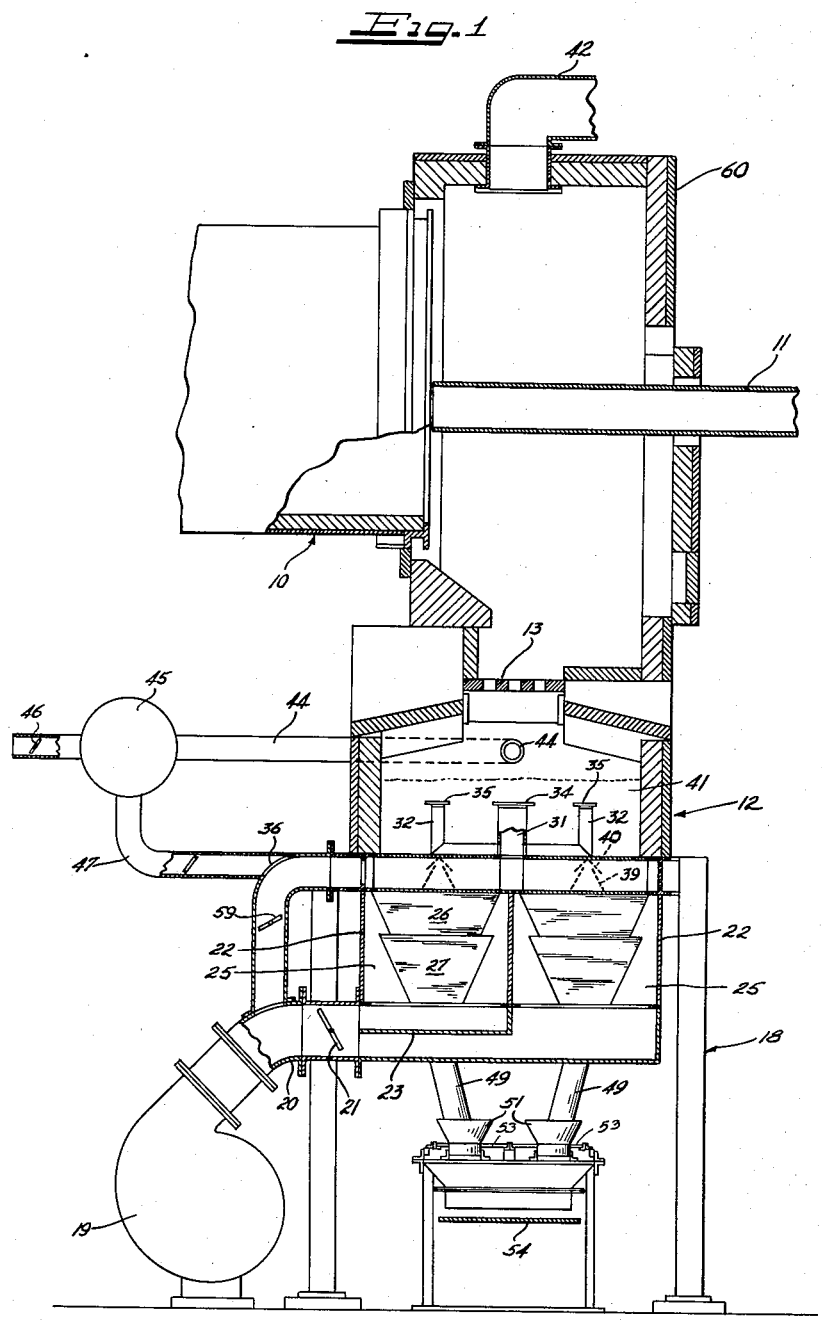
Figure 1 is an elevational view, partially in cross-section, illustrating the cooler of the present invention.

In Figure 1, reference numeral 10 indicates generally a rotary kiln in which the refractory particles are subjected to the elevated temperatures required for their processing. One or more burners 11 may be located at the discharge end of the kiln 10 to supply heat to the particles for whatever chemical or physical change is to be accomplished.

Figure 2:
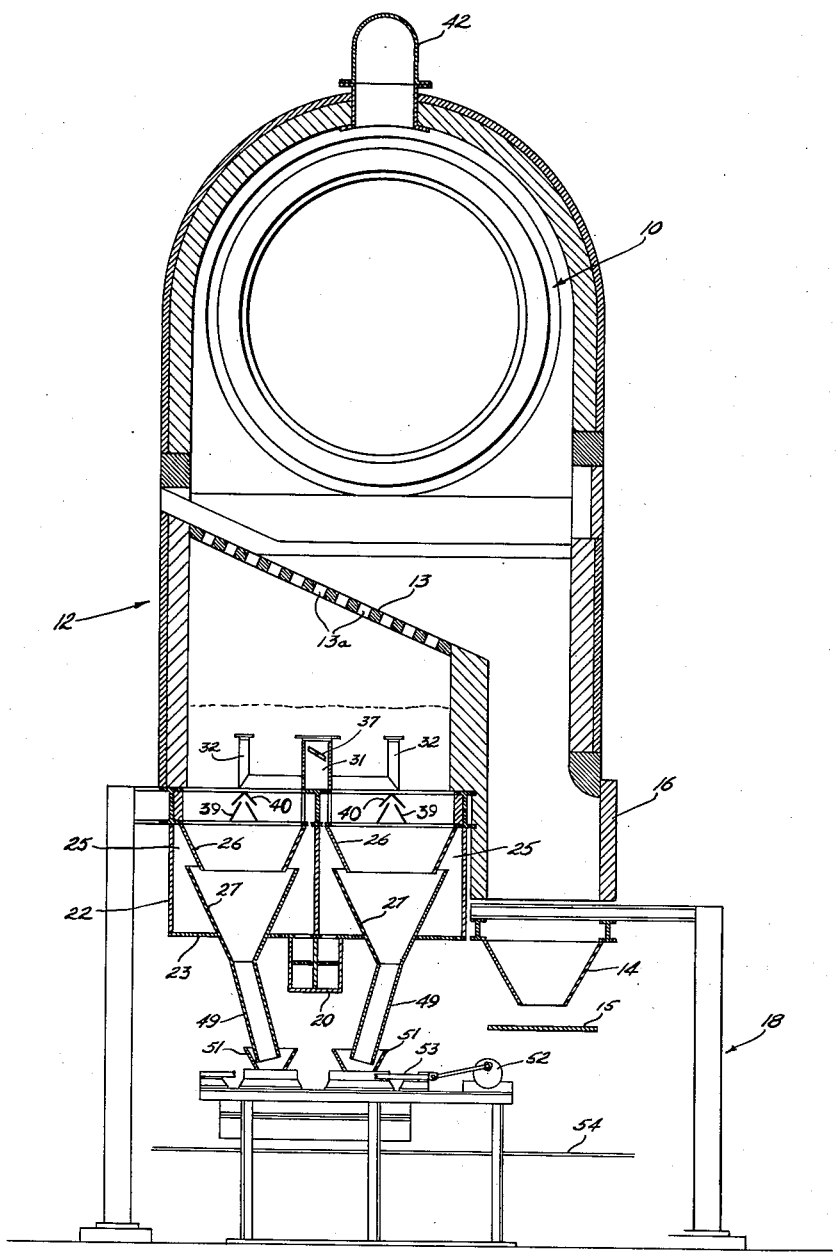
Figure 2 is an end elevational view, partially in cross-section, of the cooler shown in Figure 1.

The kiln 10 is suitably inclined so that it discharges its particles by gravity into a cooling chamber, generally indicated at numeral 12. Immediately upon being discharged from the kiln 10, the refractory particles fall on a grate 13 (Figures 1 and 2), where the desired smaller particles (usually 1 inch in maximum dimension or less) pass through a series of apertures 13a in the grate 13 but any large lumps or agglomerated material are retained by the grate 13 and eventually drop by gravity into a discharge chute 14, from which they drop onto a conveyor belt 15 for reprocessing or other means of disposal. An access door 16 is provided for cleaning out the discharge area.

The air directing means for supplying the cooling air to the cooler 12 are supported on a frame work generally indicated at 18 in the drawings. The major portion of the air supplied to the cooler is delivered at a positive pressure from a blower 19 through a duct 20. A damper 21 is provided within the duct 20 to control the flow of air therethrough.

A plurality of vertical baffle elements 22 and horizontal baffle elements 23 divide the frame 18 into a plurality of adjoining plenum chambers 25 which direct the cooling air upwardly against the descending bed of refractory particles. Included within each of the plenum chambers 25 is a pair of discharge hoppers 26 and 27.

Figure 3:
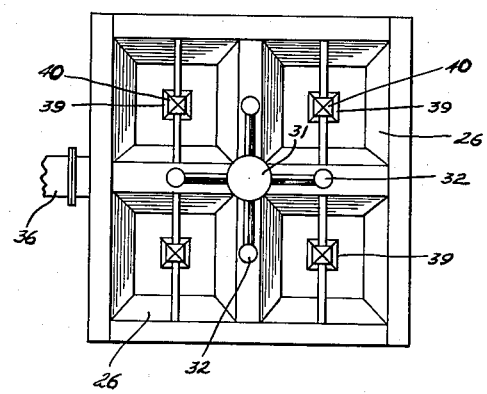
Figure 3 is a plan view of one of the air distributing means employed.

Initially, the hot particles falling through the grate 13 are contacted by a relatively high velocity stream of cooling air being supplied by a centrally disposed air inlet pipe 31 which communicates with a plurality of radially disposed air inlet pipes 32 of smaller diameter than the central pipe 31 (see Figure 3). The central pipe 31 and the pipes 32 are each provided with baffles 34 and 35, respectively, which serve the dual function of diffusing the air being introduced through the pipe, and preventing solid particles from dropping into the pipe. Preferably, the baffles 34 and 35 take the form of imperforate plates which are held frictionally in spaced engagement with the ends of their respective pipes.

Air is supplied under pressure to the aforementioned air inlet means through a branch pipe 36 which is fed from the blower 19. A damper 37 (Figure 2) in the central pipe 31 controls the relative amount of air distributed by the central pipe 31 and its associated pipes 32, and a damper 59 in the pipe 36 controls the relative amount of air distributed to the central pipe 31, the pipes 32, and the plenum chambers 25.

The volumetric flow rate of the air supplied by the blower 19 will vary, depending upon the size of the particles, the temperature reduction to be effected, and similar factors. It will also depend on the kiln efficiency which limits the amount of cooling air that can be used for combustion. Generally, the air flow rate for cooling ordinary dead-burned dolomite particles will vary from about 130 to 250 cubic feet per minute per square foot of bed area at standard conditions of temperature and pressure. Of this volume, about 10 to 20% is usually passed through the pipes 31 and 32, and the remainder is directed into the plenum chambers 25.

When the air velocity is adjusted to the proper value, the surface of the bed of refractory particles 41 will be put into a state of motion resembling, at its surface, a boiling liquid. This action need extend down from the surface for only a few inches in order to secure the effects of bed leveling, prevention of segregation, and prevention of agglomeration characteristic of this invention. This continuous agitation during passage of the cooling air through the mass provides an essentially level bed surface, prevents the segregation of the fines in the center; and prevents the agglomeration of particles into dense balls. The level bed of uniform particle gradation eliminates the disadvantages previously mentioned, while the agitation also provides for more efficient heat transfer from the particles to the air stream because of larger surface areas exposed and the freedom from channelling effects.

The air passing through the bed of refractory particles, and heated thereby, can then be directed into the kiln to increase the efficiency and to improve the flame characteristics at the latter. A portion of this air may be vented to an exhaust pipe 42 located on a firing hood 60 connecting the main body of the cooler 12 with the kiln to be used for drying the fuel used in the kiln.

To increase the efficiency of the cooling system, it is sometimes desirable to withdraw a portion of the air which has passed through the bed 41 through a conduit 44 (Figure 1) and pass this portion through a blower 45 where it may be combined with controlled amounts of outside air, the proportioning between the air from the cooler and outside air being adjusted by means of a damper 46. The commingled outside air and heated air are introduced into a duct 47 and ultimately into the duct 36 for passage to the center pipes 31 and 32. It is also possible to pass this air back to the blower 19 or the duct 20, but its main purpose is to provide a recirculated flow of air to agitate the bed surface and cool the hot particles without reducing the amount of air blown into the plenum chamber 25.

For most efficient operation of the cooling section, it is important that there be a uniform continuous downdraw of the material being discharged. The particular means shown in the drawing for securing a continuous discharge include the discharge hoppers 26 and 27 which are provided at their lower ends with standpipes 49. Each of the standpipes 49 is relatively long in length compared to its cross-sectional dimensions to limit the loss of air from the plenum chamber and is spaced from a hopper 51 into which it discharges to provide a bleed-off to the atmosphere before the material is discharged by the feeder. Without this bleedoff, the air would blow out at the point of material discharge and would tend to carry particles with it. Each hopper 51 is part of a feeder mechanism in which a motor reducer driving crank 52 connected to a reciprocating bar frame 53 controls the discharge of the feeding assembly onto a conveyor belt 54.

To further improve the uniformity of the down-draw through the hoppers 26 and 27, the cooler may be provided with a plurality of air port baffles 39 and 40, one such combination being located centrally of each hopper 26. These baffle structures serve the dual purpose of admitting air at the center of each hopper and preventing the direct down-draw or channelling of material through each hopper. This structure yields a more uniform draw across the cooling section by causing a peripheral draw around the air port baffles 39 and 40.

The air introduced through the air port baffles 39 and 40 enables the air to be admitted across the entire cross section of the unit thereby further increasing the efficiency.

Figure 4:
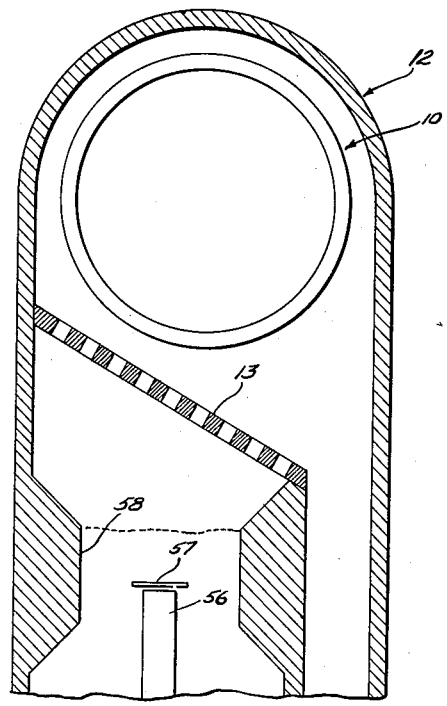
Figure 4 is a somewhat schematic, fragmentary elevational view of a modified form of the invention.

A modified form of the invention is illustrated in Figure 4 of the drawings. This form of the invention is intended to be employed where it is desired to achieve a very quick initial cooling or quenching action, or where the cross section of the main body of the cooler is too large to obtain the high velocities necessary to agitate the bed effectively. In this form of the invention, the upper air inlet means may consist of a single pipe 56 and a baffle 57 spaced above the upper open end of the pipe 56 and disposed within a restricted throat 58. Of course, a plurality of pipes could be employed if desired. The restriction of the cross-sectional area near the surface of the bed increases the air velocity and therefore increases the heat transfer rate and the rate of cooling. Otherwise, the air inlet means 56 functions in the same manner as the pipes 31 and 32 of the previously described embodiment to provide a relatively dense phase suspension of particles presenting a substantially level surface. Restriction of coolers having large cross-sections, i.e., having a relatively low tonnage input per square foot of cross section is necessary because otherwise such a high proportion of the cooling air would have to be passed through the upper air inlet that heat transfer efficiencies would be adversely affected.

In the operation of the cooling systems, the particles discharged from the rotary kiln 10 pass through the grate 13 and are thereupon contacted with the high velocity air streams from the pipes 31 and 32 in combination with the air streams from the plenums 25 to provide the desired dense phase suspension. Some of the particles will continuously settle out by gravity into a plurality of streams and pass into the discharge zones provided by the spaced hoppers 26. As the particles fall through the zones, they are contacted with additional amounts of air counter-currently from the air being supplied into the plenum chambers 25. This additional cooling effect brings the temperature of the particles down to the desired level where they can be handled for further processing or for storage.

It will be evident that various modifications can be made to the described embodiments without departing from the scope of the present invention.

I claim as my invention:

1. An apparatus for cooling refractory particles which comprises means defining a cooling zone, a first air inlet means located centrally of said zone, a plurality of auxiliary air inlet means of smaller cross-section than said first air inlet means disposed in spaced relation about said air inlet means in said cooling zone, air directing means arranged to introduce pressured air into said first air inlet means and said auxiliary air inlet means, a plurality of secondary air inlet means disposed below said first air inlet means and spaced about the center of said zone, said secondary air inlet means being in fluid communication with said air directing means, and means for adjusting the amount of air passed to said secondary air inlet means independently of the amount of air passed to said first air inlet means.

2. An apparatus for cooling refractory particles which comprises means defining a cooling zone, a first air inlet means located centrally of said zone, a plurality of auxiliary air inlet means of smaller cross-section than said first air inlet means disposed in spaced relation about said air inlet means in said cooling zone, air directing means arranged to introduce pressured air into said first air inlet means and said auxiliary air inlet means, means for adjusting the amount of air passed to said secondary air inlet means independently of the amount of air passed to said first air inlet means, and a plurality of secondary air inlet means disposed below and coaxially with said auxiliary air inlet means, said secondary air inlet means being in fluid communication with said air directing means.

3. An apparatus for cooling refractory particles which comprises means defining a cooling zone, an air inlet means located centrally of said zone, means for supplying air under pressure to said air inlet means, a plurality of discharge means disposed in spaced relation to the center of said zone, a relatively long standpipe associated with each of said discharge means, and means associated with said standpipes to provide a bleed-off of air to the atmosphere.

4. An apparatus for cooling refractory particles which comprises means defining a cooling zone, a first air inlet means located centrally of said zone, a plurality of auxiliary air inlet means of smaller cross-section than said first air inlet means disposed in spaced relation about said air inlet means in said cooling zone, air directing means arranged to introduce pressured air into said first air inlet means and said auxiliary air inlet means, a plurality of secondary air inlet means disposed below and coaxially with said auxiliary inlet means, said secondary air inlet means being in fluid communication with said air directing means, and means for adjusting the amount of air passed through said secondary air inlet means independently of the amount of air passed to said first air inlet means.

References Cited in the file of this patent

UNITED STATES PATENTS

| | | |
|---|---|---|
| 1,496,094 | Moetteli | June 3, 1924 |
| 2,529,366 | Bauer | Nov. 7, 1950 |
| 2,587,378 | Petersen | Feb. 26, 1952 |
| 2,653,809 | Azbe | Sept. 29, 1953 |
| 2,761,668 | Sylvest | Sept. 4, 1956 |